Figure 1:
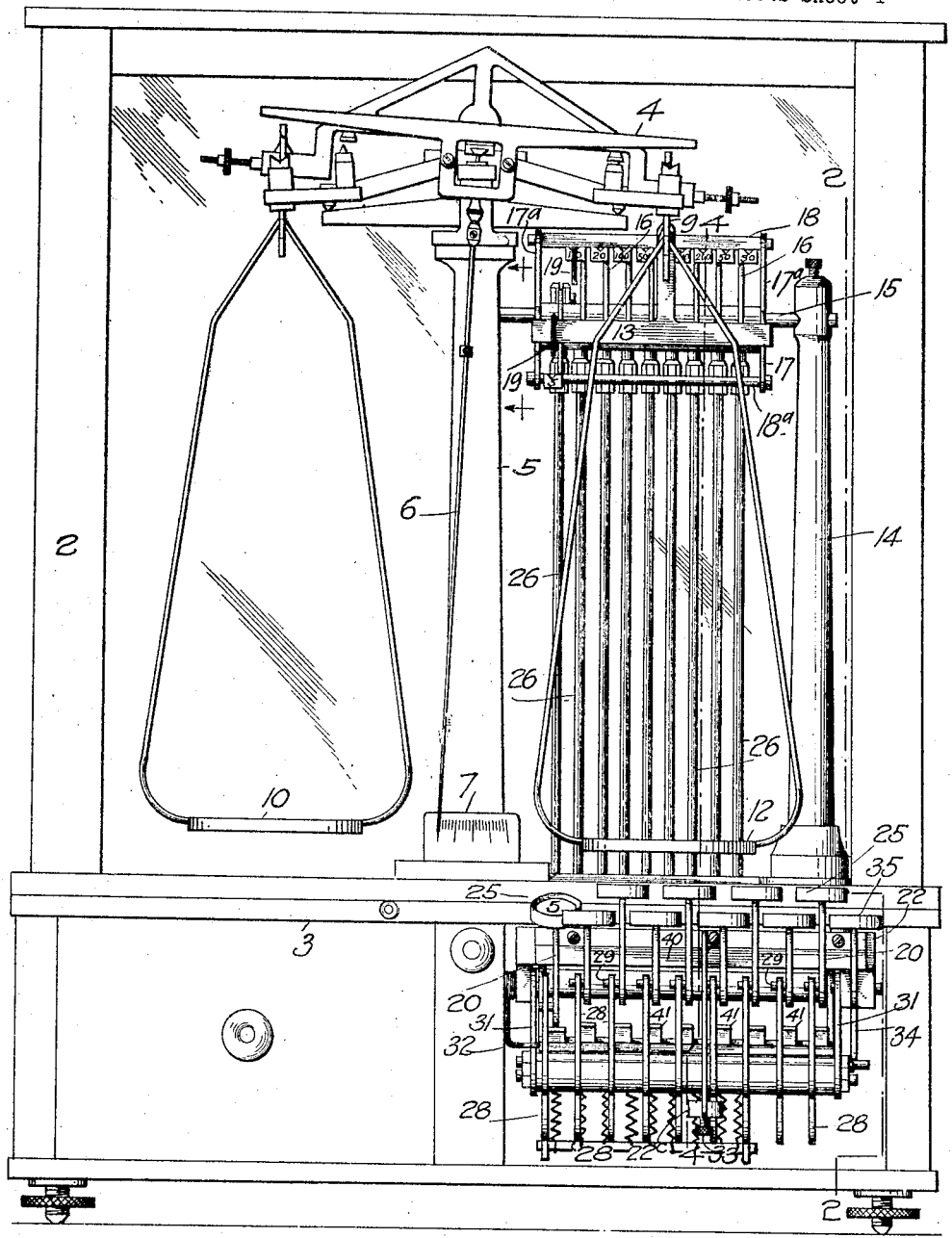

Jan. 6, 1925.

A. W. AINSWORTH 1,521,923

WEIGHING INSTRUMENT

Filed Feb. 20, 1922   3 Sheets-Sheet 1

INVENTOR.
A. W. Ainsworth
BY
ATTORNEY.

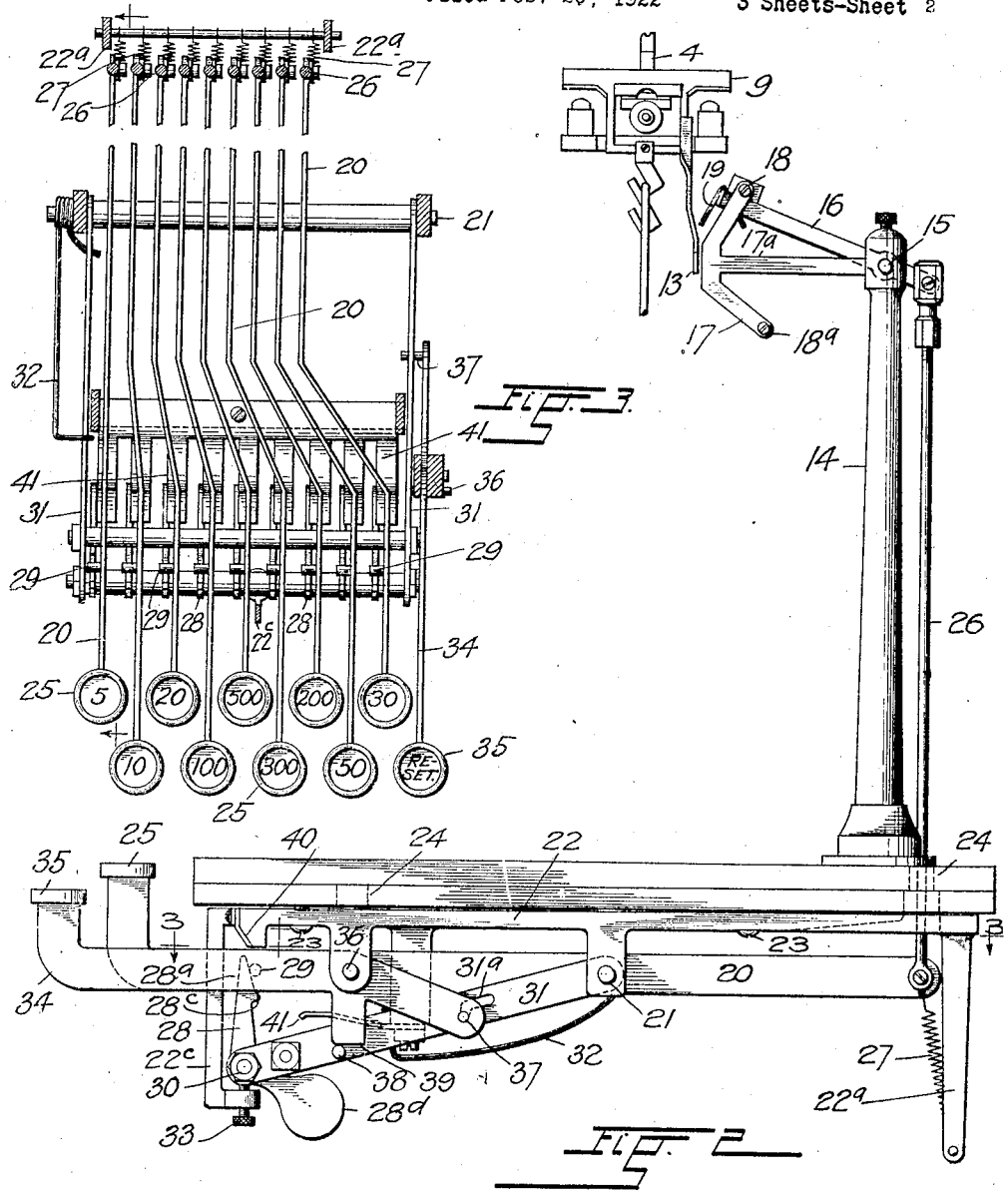

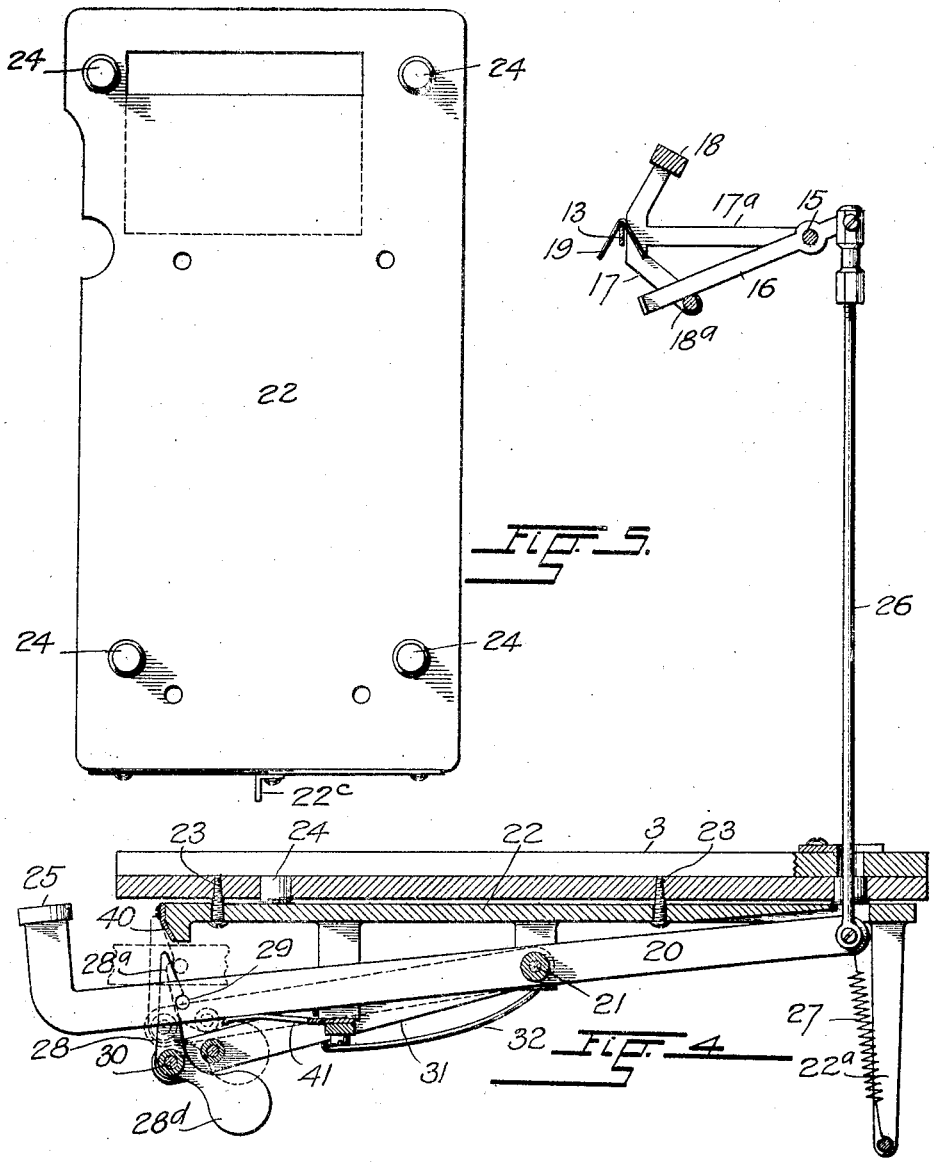

Patented Jan. 6, 1925.

1,521,923

UNITED STATES PATENT OFFICE.

ALFRED W. AINSWORTH, OF DENVER, COLORADO.

WEIGHING INSTRUMENT.

Application filed February 20, 1922. Serial No. 537,838.

*To all whom it may concern:*

Be it known that I, ALFRED W. AINSWORTH, a citizen of the United States, residing at Denver, in the county of Denver and State of Colorado, have invented certain new and useful Improvements in Weighing Instruments, of which the following is a specification.

This invention relates to precision weighing instruments and an object of the invention is to provide in a balance of the type commonly used by chemists and assayers, a simple, conveniently arranged and easily manipulated mechanism for placing and removing the small weights usually employed in addition to those placed in one of the pans of the instrument to accurately measure the weight of an object supported in the other.

Another object of my invention resides in a mechanism of the character described which is manipulated from outside the casing in which the instrument is enclosed, and still further objects reside in the construction, arrangement and combinations of parts hereinafter described with reference to the acompanying drawings in which is illustrated an embodiment of my invention in its preferred form.

In the drawings in the several views of which corresponding parts are indicated by like characters of reference, Figure 1 represents a front elevation of a weighing instrument to which my invention is applied;

Figure 2, a vertical section taken on the line 2—2, Figure 1;

Figure 3, a fragmentary section along the line 3—3 of Figure 2;

Figure 4, a section on the line 4—4, Figure 1 showing one of the keys of the operating mechanism in its locked condition, and Figure 5, a plan view of the plate on which the operating keys included in the mechanism are assembled.

Referring to the drawings, 2 designates the dust-proof casing of a weighing instrument, erected upon a hollow base 3 and usually provided with a sliding door to give access to the enclosed mechanism.

The weighing instrument consists of a scale beam 4 which is centrally supported upon a knife edge bearing on a pillar 5 erected on the base.

A downwardly extending pointer 6 on the beam cooperates with a graduated scale 7 to indicate the periods of oscillation of the moving parts of the instrument in the operation thereof.

Movably supported at opposite ends of the scale beam are hangers 8 and 9 adapted for the suspension of pans 10 and 12 upon which are carried, respectively the object or material to be weighed and one or more weights of approximately equivalent measure.

In order to ascertain the weight of the object or material supported in the pan 10, more accurately than is possible by the use of weights placed in the pan 12, the hanger 9 from which the latter is suspended is provided with a horizontal bar 13 for the support of one or more very small weights of different values which are placed thereon through the instrumentality of the mechanism which is the subject of the present invention.

Mounted rearward of the bar 10 between the pillar of the balance and a column 14 erected on the base, is a horizontal shaft 15 which serves as a fulcrum for a plurality of levers 16.

The levers are adjustably arranged between two side members 17$^a$ of a stationary frame 17 which is mounted on the shaft 15 to provide a means for limiting the movement of the levers in opposite directions.

The frame, with this end in view, comprises two parallel stop bars 18 and 18$^a$ fastened between the slide members of the same, respectively above and below the horizontal plane of the axis of rotation of the levers.

Each lever has a long arm bent laterally at its extremity for the support of one of a plurality of small weights 19 which, preferably, are made in the form of V-shaped riders, and the other, short arm of each lever, connects with a corresponding part of an operating mechanism hereinafter to be described.

The bent extremity of the long arm of each lever swings in the operation, through an arc in close proximity to the bar 13 on the pan hanger and when one of the V-shaped riders is suspended from the arm of the lever, and the latter is in a position above the bar, as shown in full lines in Figure 2 of the drawings, the bar extends in the path of the outside leg of the rider and removes the same from the lever when the latter moves in a downward direction.

The rider supported on the bar has its opposite leg in the arcuate path of the lever so that when the latter is returned to its original position, the bent extremity of its long arm will pick the rider off the bar and carry it upwardly.

By using riders of different values, each cooperating with one of the levers, and by providing an operating mechanism by which said levers may be separately raised or lowered, the total weight acting upon the arm of the scale beam may be adjusted to a degree of accuracy which renders it the correct equivalent of the object or material being weighed.

The operating mechanism hereinbefore referred to consists of a series of depressible keys 20 which are fulcrumed upon a horizontal shaft 21 beneath the top of the hollow base upon which the instrument is supported.

For convenience in constructing, adjusting and arranging the different parts of the mechanism contained in the base of the instrument, they are preferably assembled upon a plate 22 which is fastened to the top of the base by screws 23 and by dowels 24 fitted in openings of the same.

The keys which in number and relative position correspond with the rider carrying levers, have the ends of their forwardly extending arms bent upwardly for the application of push buttons 25 and by making said arms and their upwardly extending portions of different lengths, these push buttons are arranged in two rows and at different elevations to facilitate their manipulation.

The opposite ends of the keys are connected to the short arms of the corresponding rider-carrying levers by rods 26 which extend through alined slots in the plate 22 and the top of the base.

Each key is held in its normal position in which the corresponding lever 16 extends upwardly in contact with the upper stop bar 18 as shown in full lines in Figure 2 of the drawings by a coiled spring 27 which at its lower end is attached to a bar extending between two depending arms 22ª of the supporting plate.

It will be seen that by depression of the keys at their forward ends against the restraining influence of their respective springs, the corresponding levers are moved about their common fulcrum to deposit the respective riders on the bar of the scale hanger and a means for locking the keys in their depressed condition independent of each other is essential in order to retain the riders on the bar at the will of the operator.

With this object in view, I have arranged in adjacency to each key a latch 28 which cooperates with a laterally projecting pin 29 to hold the key in its lowered position.

The several latches are movably mounted upon a rod 30 at the forward end of a rocker frame 31 which is pivotally supported upon the same shaft 21 which provides the fulcrum for the keys.

A wire spring 32 yieldingly holds the frame in its normal position in which it rests upon an adjustable screw 33 on a downwardly extending arm 22ᶜ of the supporting frame.

Each of the latches has a bevel-edged head 28ª which is shouldered as at 28ᶜ to engage the laterally projecting pin 29 of the corresponding key. The latch is pivotally mounted upon the rod 30 at the forward end of the frame and it carries a counterbalancing weight 28ᵈ which maintains it in engagement with the pin.

The frame 31 on which the latches are supported is movable against the restraining influence of its spring 32 to reset the adjusted levers whenever it is desired to lift the riders from the bar on the pan hanger, and it is to this purpose connected with a reset key 34 which has a button 35 in alinement with one of the rows of buttons on the other keys.

The reset key is fulcrumed on the plate 22 as at 36, and it is connected to one of the side bars of the rocking frame by a pin 37 extending through an annular slot 31ª thereof.

When the parts of the operating mechanism are in their normal position, the frame 31 is locked against upward movement by means of a laterally extending pin 38 which engages a depending lug 39 on the reset key 34.

After one or more of the keys have been depressed to deposit the riders carried on the respective levers upon the bar of the pan hangers, their pins 29 which normally engaged the beveled edges of the heads of the latches move into engagement with the shoulders 28ᶜ of the same and the levers are thereby locked in their adjusted positions as shown in full lines in Figure 4.

When afterwards it is desired to lift the riders off the bar by a return movement of the levers to their original positions, the operator depresses the reset key 34 and thereby lifts the rocker frame against the restraining influence of its spring.

Owing to the upward movement of the frame on which the latches are mounted, the keys 20 which are kept in engagement with the shoulders thereof through the medium of their springs 27 are compelled to follow said movement and they are thus returned to their original positions while the riders are lifted off the bar by the ends of the levers sweeping past the same.

While the keys are regaining their original position the latches are disengaged from the pins thereof by the contact of the beveled edges of their heads with a slanting releasing blade 40 on the supporting plate 22, which effects a pivotal movement of the latches away from the pins with which they engaged and permits of their moving past the same when the rocker-frame is subsequently returned to its original position by the action of the spring 32 after the reset key is released from pressure.

In order to avoid to some extent the placement of undesired weights upon the bar of the pan hanger by inadvertent depression of the wrong keys, I have provided a number of stiff springs 41 extending separately beneath the keys to yieldingly retard their downward movement.

The springs after being engaged by their respective keys demand an increased exertion on the part of the operator to complete the operative movement of the same, and the temporary retardation is usually sufficient to permit of the operator detecting the error and releasing the key before the respective rider has been placed on the bar.

The buttons at the ends of the keys have designations as shown in Figure 3, giving the value of the respective weights adjusted by their operation, and the bent portions of the levers on which the riders are carried may likewise be numbered according to the different measures of the same, as indicated in Figure 1.

Having thus described my invention what I claim and desire to secure by Letters-Patent is:

1. In an instrument of the character described, the combination with a scale-beam having a rider-supporting member, of a rider-carrying lever cooperating with said member for the deposit and removal of a rider, a depressible key, means for operating the lever by depression of the key to deposit a rider on the member, and means for locking the key in a depressed position.

2. In an instrument of the character described, the combination with a scale beam having a rider-supporting member, of a rider-carrying lever cooperating with said member for the deposit and removal of a rider, a depressible key, means for operating the lever by depression of the key to deposit the riders on the member, means for locking the key in an adjusted position, and a resilient element yieldingly opposing the downward movement of the key prior to the locking engagement of said means therewith.

3. In an instrument of the character described, the combination with a scale beam having a rider-supporting member, of a number of rider-carrying levers cooperating with said member for the deposit and removal of riders, a corresponding number of depressible keys, means for the operation of the levers by depression of the keys to deposit the riders on the member, means for locking each key in an adjusted position, and means to release the adjusted keys from said locking means.

4. In an instrument of the character described, the combination with a scale beam having a rider-supporting member, of a number of rider-carrying levers cooperating with said member for the deposit and removal of riders, a corresponding number of depressible keys, means for the operation of the levers by depression of the keys to deposit the riders on the member, means for locking each key in an adjusted position, and means to release the adjusted keys simultaneously from said locking means.

5. In an instrument of the character described, the combination with a scale beam having a rider-supporting member, of a rider-carrying lever cooperating with said member for the deposit and removal of a rider, a depressible key, means for operating the lever by depression of the key to deposit the rider on the member, means for locking the key in an adjusted position, and a spring acting upon the key to return it to its normal position when released from said locking means.

6. In an instrument of the character described, the combination with a scale beam having a rider-supporting member, of rider-carrying levers cooperating with said member for the deposit and removal of riders, depressible keys, means for the operation of the levers by depression of the keys to deposit the riders on the member, means for locking each key in an adjusted position, and means to release the adjusted keys from said locking means, including a depressible key-member.

7. In an instrument of the character described, the combination with a scale beam having a rider-supporting member, of rider-carrying levers cooperating with said member for the deposit and removal of riders, depressible keys connected with said levers, a pivoted frame, latches mounted thereon, members on the keys, cooperating with the latches to retain the keys in an adjusted position, a reset-key operatively connected to the frame, and an element cooperating with the latches to disengage them from the key-members by a movement of the frame.

8. In an instrument of the character described, the combination with a scale beam having a rider-supporting member, of rider-carrying levers cooperating with said member for the deposit and removal of riders, depressible keys connected with said levers, and mounted to move about a common axis, a frame mounted to move about the axis of the keys, latches on the frame, members on the keys cooperating with the latches to lock the keys in an adjusted position, a reset-key operatively connected to the frame, and an element cooperating with the latches to disengage them from the key-members by a movement of the frame.

9. In an instrument of the character described, the combination with a scale beam having a rider-supporting member, of rider-carrying levers cooperating with said member for the deposit and removal of riders, depressible keys connected with said levers, a pivoted frame, latches pivotally mounted thereon and having bevel-edged heads, pins on the keys engaging with the latch-heads to lock the keys in an adjusted position, a reset-key operatively connected to the frame, and a slanting blade engaging with the latches by a movement of the frame, to release them from the key-pins.

10. In an instrument of the character described, the combination with a scale beam having a rider-supporting member, of rider-carrying levers cooperating with said member for the deposit and removal of riders, depressible keys connected with said levers, a pivoted frame, a spring engaging therewith, latches on the frame, members on the keys cooperating with the latches to retain the keys in an adjusted position, a reset-key adapted to move the frame against the resistance of said spring, and an element cooperating with the latches to release them from the key-members by the movement of the frame.

11. In an instrument of the character described, a supporting base, a scale beam having a rider-supporting member, of rider-carrying levers cooperating with said member for the deposit and removal of the riders, mechanism for the operation of said levers, comprising depressible keys, means for locking the keys in an adjusted position and means for releasing the same from the locking-means, a plate upon which said mechanism is assembled, attached to the base, and rods connecting the keys to the levers.

12. In an instrument of the character described a supporting base, a scale beam having a rider-supporting member, of rider-carrying levers cooperating with said member for the deposit and removal of the riders, mechanism for the operation of said levers, comprising depressible keys, means for locking the keys in an adjusted position, and means for releasing the same from the locking-means, a plate upon which said mechanism is assembled, adjustably attached to the base, and rods connecting the keys to the levers.

13. In an instrument of the character described, a scale beam having a rider-supporting member, of a rider-carrying lever cooperating with said member for the deposit and removal of a rider, a depressible key operatively connected with the lever, a gravity latch mounted for upward movement and cooperating with the key for locking it in an adjusted position, a key to effect said movement of the latch, and an element adapted to release the latch from locking engagement with the first-mentioned key by its movement through the medium of the reset-key.

In testimony whereof I have affixed my signature.

ALFRED W. AINSWORTH.